UNITED STATES PATENT OFFICE.

EMERICH SZARVASY, OF BUDAPEST, HUNGARY.

PROCESS FOR THE MANUFACTURE OF CARBON ELECTRODES OR OF PURE RETORT-CARBON.

1,392,266.      Specification of Letters Patent.    Patented Sept. 27, 1921.

No Drawing.      Application filed June 3, 1920. Serial No. 386,410.

*To all whom it may concern:*

Be it known that I, EMERICH SZARVASY, citizen of Hungary, residing at Budapest, in Hungary, have invented certain new and useful Improvements in Processes for the Manufacture of Carbon Electrodes or of Pure Retort-Carbon (for which I have filed an application in Hungary, Jan. 29, 1918,) of which the following is a specification.

My Patent Number 1,199,220 of April 12, 1916, has for its object a process for the manufacture of entirely pure retort carbon by dissociation of methane, consisting of subjecting methane to thermal decomposition in such a manner that the body heated to the decomposing temperature consists itself of pure retort carbon having been produced previously by the same process.

If the thermal decomposition is produced by external heating, not only the carbon fragments contained in the decomposing chamber but also the walls of said chamber will be heated to the dissociation temperature. Therefore the carbon will be deposited at the start on the walls of the decomposing chamber forming a hard crust, hardly removable without injuring the decomposing chamber. Besides it is very difficult and expensive to obtain decomposing chambers consisting of a material able to resist for a considerable time to the high temperatures to be applied with the external heating and enough resistant to allow the breaking of the hard carbon crust.

According to my invention I overcome these difficulties by forming at least the section of the decomposing tube heated above the dissociation temperature of methane or the whole, preferably tubular, decomposing chamber of pure retort carbon produced previously by the dissociation of methane by the same process, said carbon tubes or the like being manufactured by a method used for instance for the manufacturing of carbon electrodes.

The decomposition of methane may be performed in the manner described in my former Patent No. 1,199,220 viz., by filling into the tube fragments of retort-carbon produced previously by the same process, heating the tube externally to the decomposing temperature and passing methane over the glowing carbon fragments contained in said glowing tube.

The carbon obtained by the decomposition of methane will be deposited partly on the carbon fragments and partly on the inner surface of the carbon tube. By the carbon-deposit formed on the inner surface of the carbon tube, the cross section of this latter will be gradually reduced. When this cross section is reduced so far that no efficient work is possible, the decomposition will be stopped, the filling will be removed and the carbon tube, consisting of the same pure carbon will be crushed together with said deposit and used in the well known manner partly for manufacturing decomposing tubes for further methane decomposition, while the remaining carbon can be used for manufacturing carbon electrodes or for other purposes.

As the incandescent walls of the carbon tube form by themselves efficient catalytic surfaces for the dissociation of methane, the carbon fragment filling may be dispensed with. However one may start the process with a filling of carbon fragments in the tube, and diminish the filling gradually as the cross section of the tube gets reduced, remove the filling totally, when the cross section becomes too narrow and continue the decomposition until the cross section of the tube is filled out completely or nearly so.

With well-known methods for example by diluting the methane with inert gases, by conducting the gas flow with a suitably high speed and by using suitable temperatures it is possible to control the operation that one part of the carbon proceeding from the decomposition of methane will be carried off by the gases as soot and may be collected outside of the decomposing chamber.

What I claim is:

1. A process for the manufacture of entirely pure retort carbon by the dissociation of methane, said process consisting in conducting methane through a decomposing chamber heated by external heating above the dissociation temperature of methane and composed, at the parts heated to said temperature, of pure retort carbon previously produced by the same process, whereby carbon proceeding from the decomposition of methane is deposed on the inner surface of the carbon walls of the decomposing chamber, crushing the carbon deposit together with the carbon walls of the decomposing chamber and using a part of the carbon for manufacturing further carbon decomposing chambers.

2. A process for the manufacture of entirely pure retort carbon by the dissociation of methane, said process consisting in conducting methane through a decomposing chamber heated by external heating above the dissociation temperature of methane and composed, at the parts heated to said temperature, of pure retort carbon, previously produced by the same process and containing a filling of retort carbon fragments, previously produced by the same process whereby carbon proceeding from the decomposition of methane is deposited on the carbon fragments and on the inner surface of the carbon walls of the decomposing chamber, crushing the carbon deposit together with the carbon walls of the decomposing chamber and using a part of the carbon for manufacturing further carbon decomposing chambers.

3. A process for the manufacture of entirely pure retort carbon by the dissociation of methane, said process consisting in conducting methane through a decomposing chamber heated by external heating above the dissociation temperature of methane and composed, at the parts heated to said temperature, of pure retort carbon, previously produced by the same process, and containing a filling of retort carbon fragments, previously produced by the same process, whereby carbon proceeding from the decomposition of methane is deposed on the carbon fragments and on the inner surface of the carbon walls of the decomposing chamber, removing the carbon fragments and continuing the methane decomposition with the incandescent carbon walls of the decomposing chamber as catalytic agent crushing the carbon deposit together with the carbon walls of the decomposing chamber and using a part of the carbon for manufacturing further carbon decomposing chambers.

In testimony whereof I affix my signature in presence of two witnesses.

EMERICH SZARVASY.

Witnesses:
CHAS. MEDGYES,
EUGENE HARSANI.